United States Patent [19]
Herbert

[11] Patent Number: 5,659,744
[45] Date of Patent: Aug. 19, 1997

[54] DATA FILE STORE SYSTEM WITH MEANS FOR EFFICIENTLY MANAGING FREEING OF DATA BLOCKS

[75] Inventor: Richard Herbert, Biddulph, United Kingdom

[73] Assignee: International Computers Limited, Putney, United Kingdom

[21] Appl. No.: 392,293

[22] Filed: Feb. 21, 1995

Related U.S. Application Data

[63] Continuation-in-part of Ser. No. 940,073, Sep. 3, 1992, abandoned.

[30] Foreign Application Priority Data

Oct. 15, 1991 [GB] United Kingdom .................. 9121855

[51] Int. Cl.⁶ ................................................ G06F 12/02
[52] U.S. Cl. ........................ 395/621; 395/601; 395/612
[58] Field of Search ................................. 395/997, 601, 395/612, 621

[56] References Cited

U.S. PATENT DOCUMENTS

| | | | |
|---|---|---|---|
| 4,186,438 | 1/1980 | Benson et al. | 395/600 |
| 4,420,807 | 12/1983 | Nolta et al. | 395/425 |
| 4,758,944 | 7/1988 | Bartley et al. | 364/200 |
| 4,775,932 | 10/1988 | Oxley et al. | 364/200 |
| 4,797,810 | 1/1989 | McEntee et al. | 364/200 |
| 4,802,117 | 1/1989 | Chrosny et al. | 364/900 |
| 4,807,120 | 2/1989 | Courts | 364/200 |
| 4,939,598 | 7/1990 | Kulakowski et al. | 360/48 |
| 4,985,829 | 1/1991 | Thatte et al. | 364/200 |
| 5,012,425 | 4/1991 | Brown | 364/464.02 |
| 5,025,367 | 6/1991 | Gurd et al. | 364/200 |
| 5,029,078 | 7/1991 | Iwai | 395/600 |
| 5,136,706 | 8/1992 | Courts | 395/600 |
| 5,159,678 | 10/1992 | Wengelski et al. | 395/425 |
| 5,159,681 | 10/1992 | Beck et al. | 395/425 |
| 5,247,634 | 9/1993 | Cline et al. | 395/425 |
| 5,355,483 | 10/1994 | Serlet | 395/650 |
| 5,535,369 | 7/1996 | Wells et al. | 395/497.02 |

OTHER PUBLICATIONS

IBM Technical Disclosure Bulletin, vol. 15, No. 6, Nov. 1972, pp. 1936–1938, Chesarek, "Space Management Method".

IBM Technical Disclosure Bulletin, vol. 18, No. 7, Dec. 1975, pp. 2124–2130, Duke, "Set Management Technique".

*Primary Examiner*—Thomas G. Black
*Assistant Examiner*—Jean M. Corrielus
*Attorney, Agent, or Firm*—Lee, Mann, Smith, McWilliams, Sweeney & Ohlson

[57] ABSTRACT

A file store for use as a work-in-progress store. Each block in the store is designated as a free block, a data block, or a forget block. When it is required to write data to the file store, a data area is created, by assigning free blocks. When it is required to discard a data area, a forget block is written into the filestore, pointing to the data area, and all the data blocks in that area are freed and added to a free chain. If at least one of the blocks in the data area pointed to by a forget block is reused, the forget block is freed and added to the free chain. The file store has advantages of a serial file organization while avoiding the garbage collection problems associated with conventional serial files.

3 Claims, 3 Drawing Sheets

DATA FILE STORE SYSTEM WITH MEANS FOR EFFICIENTLY MANAGING FREEING OF DATA BLOCKS

This application is a continuation-in-part of application Ser. No. 07/940,073, filed Sep. 3, 1992, now abandoned.

BACKGROUND OF THE INVENTION

This invention relates to data file storage apparatus.

The invention is particularly, although not exclusively, concerned with a data file store for use as a work-in-progress store in a transaction processing system.

In a transaction processing system, the operation of the system is divided into units, referred to as transactions. Each transaction is atomic, in the sense that, at the end of the transaction, either all the data updates associated with the transaction must be applied to their respective databases, or none, depending on whether the transaction is deemed to have been successfully completed. That is, it is not permissible to apply only some of the updates.

To ensure atomicity of transactions, it has been proposed to use a special store, referred to as the work-in progress (WIP) store, to keep a log of data updates that have been initiated by the transactions, but which have not yet been confirmed as committed. (See our co-pending European patent application No. 92304728.6). Such a store has the property that, in normal use, the only operations on the store are to write data or to delete data: reading of the store is required only in the event of a failure, requiring recovery of any transactions that have not yet committed their data updates.

Two different methods have been proposed for organising such a store: random access and serial file.

In the random access technique, each session is allocated an area of file store, for holding the required log of data updates. When the data recorded in the session is no longer required, or is updated, the old data is invalidated, by overwriting it either with the new data or with a free pattern.

This technique is potentially the most compact in terms of file store usage. However, the major disadvantages of this technique are:

(i) unless the application is well behaved, the area allocated to each transaction would either have to be large enough to hold the largest possible amount of data which can be expected, or else an overflow area has to be provided, leading to internal fragmentation or variations in performance.

(ii) such a technique may not be well suited to systems where the number of sessions is highly variable and sessions are short lived, since each session requires a fixed space allocated to it whether or not it is in use.

In the serial file technique the file store is viewed as an infinite serial file, and data is written only to the end of this file. When an item of data has to be invalidated, a special control area, referred to as a "forget block", is written to the file, indicating that the previous data item is invalid.

The main advantage of this technique is that the amount of data written for a transaction is not fixed by a predetermined size. Also, since data is written only to one point in the file (the current end pointer), several items of unrelated data can be written in one request, thus reducing head movement (in the case of a disc store).

The principal disadvantage of the serial file technique is that there is, of course, no such thing as an infinite serial file. Any practical implementation therefore requires a garbage collector to go through the file, freeing space and re-allocating areas to allow the next pass through the file to proceed. This is an expensive process in terms of processing time, and may lead to the garbage collection process becoming a bottleneck.

The object of the present invention is to provide a new technique for organising a data file store which builds on the advantages of the serial file organisation, while avoiding the worst aspects of its performance (i.e. mandatory garbage collection).

SUMMARY OF THE INVENTION

According to the invention, there is provided a data file store system comprising:

a) a file store comprising a plurality of blocks, b) means for designating each block as a free block, a data block or a forget block c) means for arranging the free blocks in a chain, d) means for creating a data area, by assigning at least one of the free blocks to the area and writing data into the area, e) means for writing into the filestore a forget block pointing to a data area to be discarded, freeing all the data blocks in that area and adding those blocks to the chain of free blocks, and f) means operative whenever at least one of the blocks in a data area pointed to by a forget block is reused, for freeing that forget block and adding the freed block to the claim of free blocks.

Preferably, the free blocks are chained together by means of a memory-resident table.

DESCRIPTION OF AN EMBODIMENT OF THE INVENTION

One data processing system including a data file store in accordance with the invention will now be described by way of example with reference to the accompanying drawings.

Figure 1:
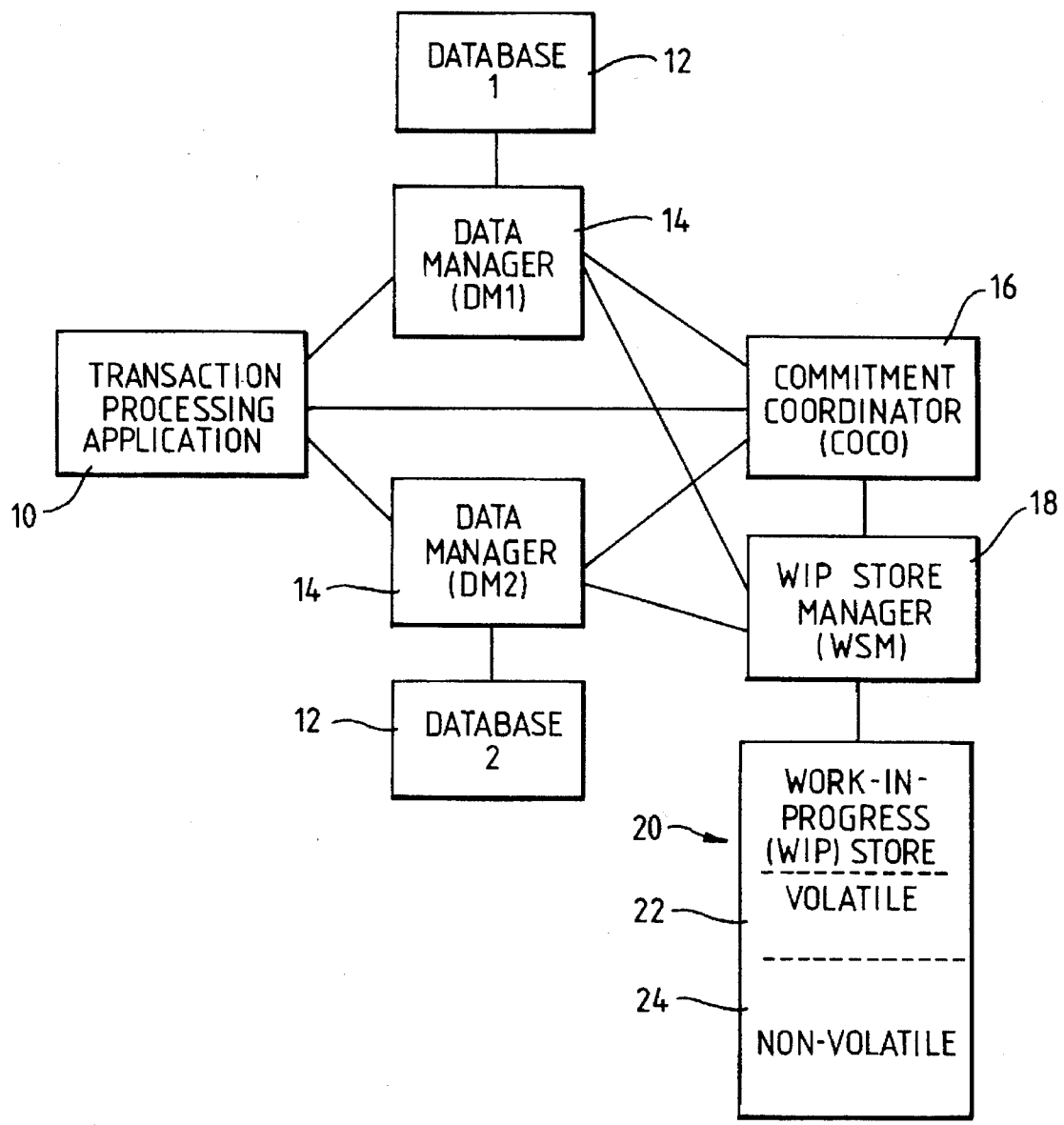
FIG. 1 is a schematic block diagram of a data processing system including a data file store in accordance with the invention.

Referring to FIG. 1, the system includes a number of application programs 10 which run in a transaction processing environment. (In this example, only one application program is shown, but in general there may be many such programs in the system).

The application program 10 can access two databases 12 (DATABASE 1 and DATABASE 2). Each of these databases has its own data manager 14 (DM1 and DM2).

The applications and the data managers all communicate with a coordination controller (COCO) 16. The data managers also communicate with a work-in-progress store manager (WSM) 18, which controls a work-in-progress (WIP) store 20.

In this embodiment the data managers, coordination controller and work-in-progress store manager are all software components which run on the same host processor as the application programs. For example, the host processor may be an ICL Series 39 system running under the VME operating system.

Communication between these components is achieved by a messaging service. Details of this messaging service form no part of the present invention and so will not be described herein.

The WIP store comprises two portions: a volatile store 22, which consists of an area of the main RAM of the system, and a non-volatile store 24, which consists of an area of disc store.

Figure 2:
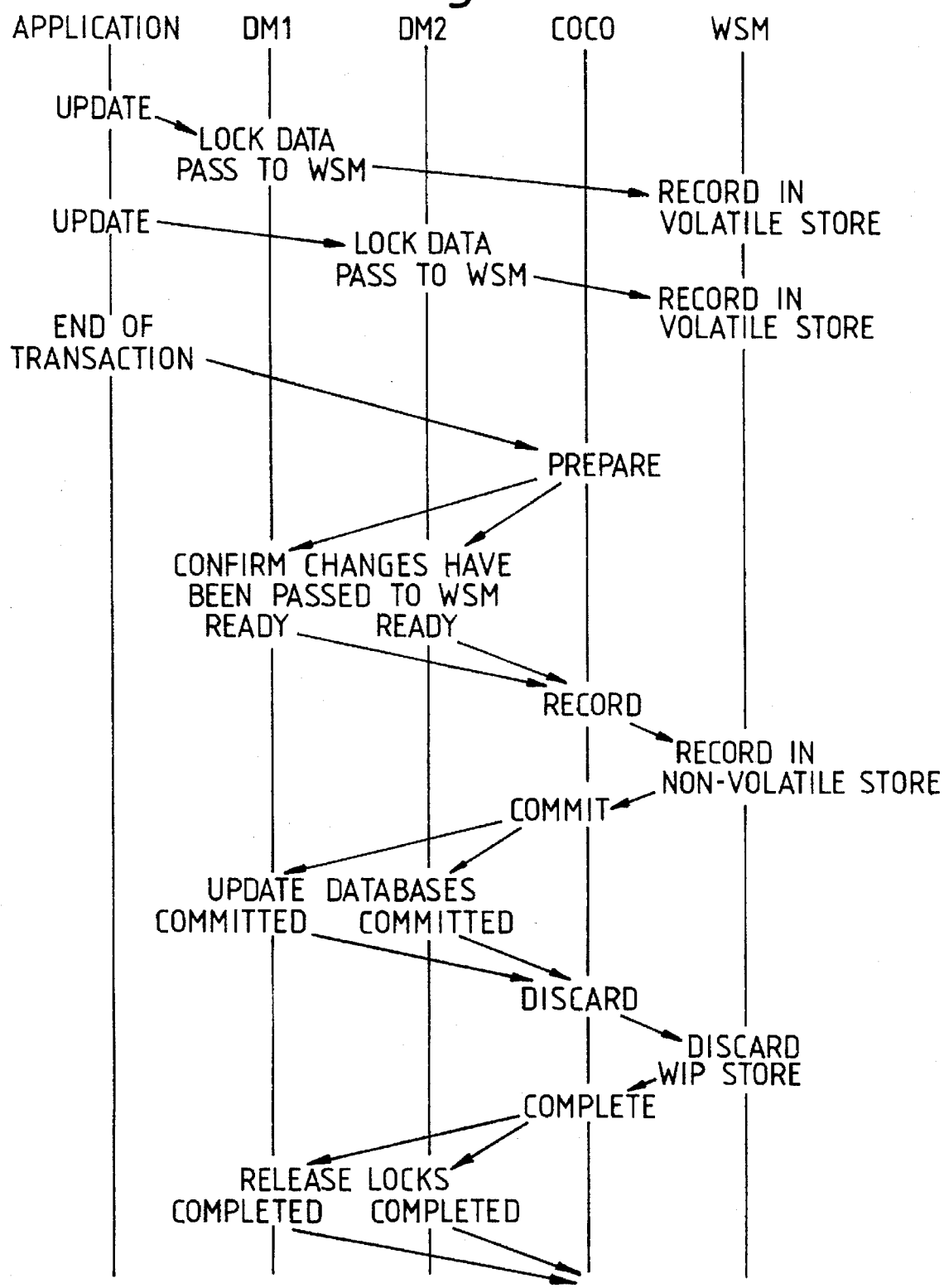
FIG. 2 is a sequence diagram illustrating the operation of the system.

Referring now to FIG. 2, this shows a typical sequence of operations of the above components.

In this example, it is assumed that the application program performs a transaction, in which it updates both the databases in turn. The data updates associated with a transaction are atomic, in that, at the end of the transaction either all the updates associated with the transaction must be applied to the respective databases, or none, depending on whether or not the transaction is deemed to have been successfully completed.

As shown in FIG. 2, whenever the application generates a database update, it sends a message to the appropriate data manager. The data manager then sets locks on the data in the database, so as to prevent any other transaction from updating the data while the present transaction is in progress, and passes details of the update to the work-in-progress store manager. The WSM then writes details of the changes to be made to the data into the volatile area of the WIP store.

When the user work for the transaction is complete, the application sends a message to the COCO. The COCO then sends a PREPARE message to each of the data managers involved in the transaction.

In response to this PREPARE message, each data manager confirms that all the changes in the data have been passed to the WSM, and returns a READY message to the COCO.

When the COCO has received READY messages from each of the data managers, it sends a RECORD message to the WSM, instructing it to record all the changes to the data (currently held in volatile store) into the non-volatile portion of the WIP store. When the WSM has done this, the COCO sends a COMMIT message to each of the data managers involved in the transaction.

In response to this COMMIT message, each data manager applies the updates to its database. No logging action is required. When it has done this, each data manager returns a COMMITTED message to the COCO.

When the COCO has received a COMMITTED message from each of the data managers, it sends a DISCARD message to the WSM, instructing it to discard the changes logged in the non-volatile portion of the WIP store in respect of this transaction. (These are no longer required since the databases have now been updated). When the WSM has done this, the COCO sends a COMPLETE message to each of the data managers involved in the transaction.

When the data managers receive the COMPLETE message, they release any locks applied to their respective databases, and return a COMPLETED message to the COCO, informing it that the transaction is now complete.

The non-volatile portion 24 of the WIP store comprises a large (greater than 1 Mbyte) area of disc file store, consisting of a number of blocks of predetermined size (e.g. 2 Kbyte). Each block has an absolute address which indicates its physical position on the disc.

Each block is designated as one of three types: data, forget and free.

Data blocks contain the transaction logging data that is to be stored in the WIP store. The data blocks are grouped into data areas, each area containing at least one block. At least the first and last data blocks of each area contain pointers, pointing to the absolute address of the other end of the area. Whenever a data area is allocated, it is given a unique name to distinguish it from any other data areas on the disc.

A forget block contains pointers to a data area, the contents of which are no longer required and hence can be discarded. These pointers include the absolute address of the first data block in the area, and the unique name of the area.

A block is set to the free state if:

(i) it has not been written (ii) it is part of a data area which is pointed to by a forget block or, (iii) it is a forget block whose data area has been partially or completely reused.

The WIP store manager maintains a main-store table which contains an entry for each block in the file store. Each entry holds an indicator for the type of block (data, forget or free), and two pointers. If the block is free, the first pointer points to the next free block in a free chain, and the second pointer points to the absolute address of the forget block (if any) that has freed this block. If the block is a forget block, the first pointer contains the absolute address of the first data block in the data area which has been freed.

Figure 3:
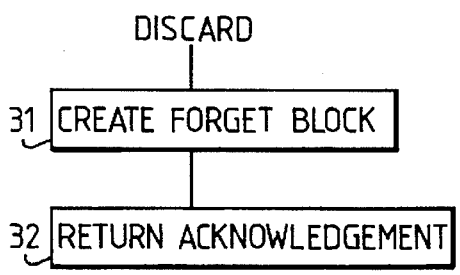
FIGS. 3 and 4 are flow charts showing the operation of the file store manager.

Referring now to FIG. 3, this shows the action of the WIP store manager in response to a DISCARD message from the COCO. The WIP store manager creates a forget block (31), pointing to the data area which is to be discarded. However, it does not write the block immediately to the WIP store, but waits until the next RECORD message, so as to avoid the need for an extra disc access. The WSM then returns an acknowledgement message (32) to the COCO.

Figure 4:
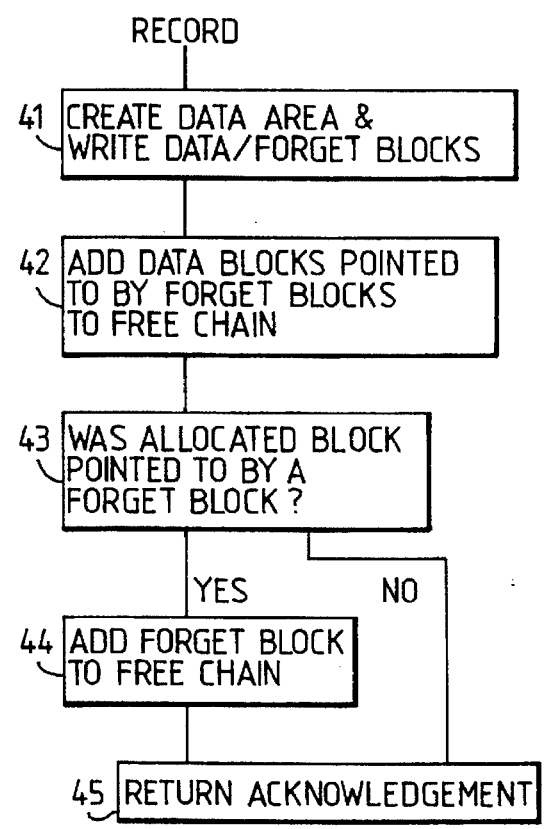

Referring to FIG. 4, this shows the action of the WIP store manager in response to a RECORD message from the COCO. The WSM creates a new data area (41), by allocating one or more sequential blocks from the head of the free chain, and writes the transaction logging data and any unwritten forget blocks into this area. Any data blocks in the data areas pointed to by these forget blocks are freed and added to the free chain (42). Freed blocks may either be added to the end of the free chain, or inserted into an ordered free chain. Adding to the end of the chain is more efficient, but is more prone to fragmentation than maintaining an ordered chain.

The WSM then checks whether any of these allocated blocks were in a data area pointed to by a forget block (43). If so, that forget block is freed and added to the free chain (44).

Finally, the WSM returns an acknowledgement message (45) to the COCO.

Preferably, the system preserves inter-session data, including the WIP store contents table, so that, following a system crash, this inter-session data can be used to access the WIP store and retrieve the transaction logging data for performing the necessary recovery process. However, if this inter-session data is lost, it will be necessary to search the WIP store, reading every record, so as to reconstruct the WIP contents table.

EXAMPLE OF OPERATION

An example of the way in which the WSM manages the WIP store will now be described.

Figure 5:
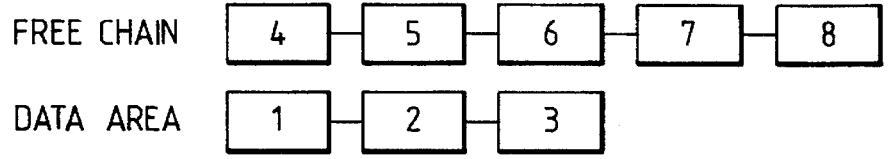
FIGS. 5–7 show an example of the operation of the file store.

Referring to FIG. 5, it is assumed that initially a data area has been created, containing blocks 1–3. The other blocks are all in the free chain.

Figure 6:
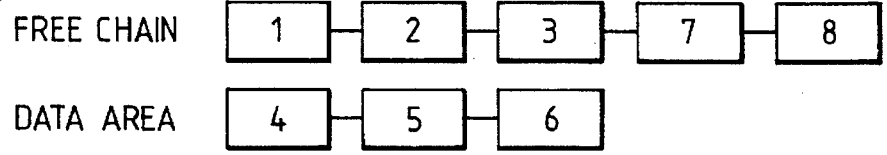

Referring to FIG. 6, a new data area is now created, consisting of blocks 4, 5 and 6 from the free chain. In this example, block 6 is a forget block which points to the data area starting at block 1, and so blocks 1–3 are freed and added to the free chain.

Figure 7:
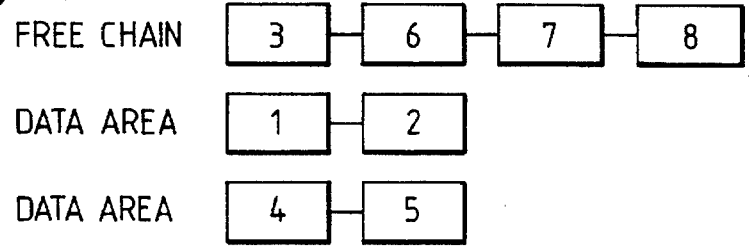

Referring to FIG. 7, another new data area is now created, consisting of blocks 1 and 2 from the free chain. Because part of the data area pointed to by forget block 6 has now been reused, block 6 is freed and added to the free chain.

I claim:

1. A method of logging transactions in a transaction processing system, using a file store comprising a volatile memory portion and a non-volatile memory portion, and containing a plurality of blocks; said method comprising the steps:

(a) designating said blocks as free blocks, data blocks, and forget blocks;

(b) writing transaction logging data into said volatile memory portion;

(c) in response to a DISCARD instruction, writing a forget block into said volatile memory portion, said forget block pointing to at least one data block to be discarded in the non-volatile memory portion; and (d) in response to a RECORD instruction, performing the following actions:

(i) creating a data area in said non-volatile memory portion by allocating a plurality of free blocks in said non-volatile memory portion;

(ii) transferring any transaction logging data and forget blocks stored in said volatile memory portion to said data area;

(iii) freeing any data blocks pointed to by any forget blocks transferred to said data area in step (ii) above; and (iv) freeing any forget blocks that point to any of said plurality of free blocks allocated in step (i) above.

2. A system according to claim 1 wherein said volatile memory comprises an area of RAM store, and said non-volatile memory portion comprises an area of disk store.

3. A transaction processing system including a file store system for logging transactions, the file store system comprising:

(a) a file store, containing a plurality of blocks, said blocks comprising free blocks, data blocks, and forget blocks, said file store comprising a volatile memory portion and a non-volatile memory portion;

(b) logging means for writing transaction logging data into said volatile memory portion;

(c) discarding means for writing forget blocks into said volatile memory portion, said forget blocks pointing to data blocks to be discarded in the non-volatile memory portion;

(d) allocation means for creating a data area in said non-volatile memory portion by allocating a plurality of free blocks in said non-volatile memory portion;

(e) transfer means for transferring transaction logging data and forget blocks from said volatile memory portion into said data area in said non-volatile memory portion;

(f) data block freeing means for freeing any data blocks in the non-volatile memory portion that are pointed to by forget blocks that have been transferred by said transfer means; and (g) forget block freeing means for freeing any forget blocks in the non-volatile memory portion that point to free blocks that have been allocated by said allocation means.

\* \* \* \* \*